United States Patent
Huang

(10) Patent No.: US 10,361,938 B2
(45) Date of Patent: Jul. 23, 2019

(54) METHOD FOR MEASURING TRANSMISSION DELAY OF OPTICAL TRANSPORT NETWORK DEVICE AND SOURCE OTN DEVICE

(71) Applicant: ZTE Corporation, Shenzhen (CN)

(72) Inventor: Kelu Huang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 356 days.

(21) Appl. No.: 15/102,786

(22) PCT Filed: Jun. 16, 2014

(86) PCT No.: PCT/CN2014/080018
§ 371 (c)(1),
(2) Date: Jun. 8, 2016

(87) PCT Pub. No.: WO2014/187430
PCT Pub. Date: Nov. 27, 2014

(65) Prior Publication Data
US 2016/0315840 A1    Oct. 27, 2016

(30) Foreign Application Priority Data
Dec. 13, 2013  (CN) .......................... 2013 1 0687152

(51) Int. Cl.
*H04L 12/26* (2006.01)
*H04J 3/06* (2006.01)
(Continued)

(52) U.S. Cl.
CPC .......... *H04L 43/0864* (2013.01); *H04J 3/065* (2013.01); *H04J 3/1652* (2013.01);
(Continued)

(58) Field of Classification Search
CPC ....... H04J 2203/0057; H04J 2203/0062; H04J 2203/0089; H04J 3/065; H04J 3/1652;
(Continued)

(56) References Cited

U.S. PATENT DOCUMENTS 9,112,629 B2 * 8/2015 Ruffini ................. H04J 3/0679
9,154,221 B2 * 10/2015 Hu ...................... H04Q 11/0067
(Continued)

FOREIGN PATENT DOCUMENTS

CN        101325470 A       12/2008
CN        101426223 A        5/2009
(Continued)

OTHER PUBLICATIONS

International Search Report in international application No. PCT/CN2014/080018, dated Oct. 14, 2014.
(Continued)

*Primary Examiner* — Raj Jain
(74) *Attorney, Agent, or Firm* — Oppedahl Patent Law Firm LLC

(57) ABSTRACT

A method for measuring transmission delay of an optical transport network (OTN) device and a source OTN device. The method comprises: a source OTN device receives a delay measurement request transmitted by a user, generates a delay request frame, and transmits the delay request frame to a destination OTN device; the source OTN device receives a response frame returned from the destination OTN device, the response frame including a first time information; after receiving the response frame returned from the destination OTN device, the source OTN device obtains the system time T4 at when the response frame is received by the source OTN device; the source OTN device parses the response frame to obtain the first time information, and calculates the transmission delay between the (Continued)

source OTN device and the destination OTN device according to T4 and the first time information.

9 Claims, 1 Drawing Sheet

(51) Int. Cl.
*H04J 3/16* (2006.01)
*H04Q 11/00* (2006.01)

(52) U.S. Cl.
CPC ............ *H04L 43/106* (2013.01); *H04L 43/18* (2013.01); *H04Q 11/0001* (2013.01); *H04Q 11/0066* (2013.01); *H04J 2203/0057* (2013.01); *H04J 2203/0062* (2013.01); *H04J 2203/0089* (2013.01); *H04Q 2011/0083* (2013.01)

(58) Field of Classification Search
CPC ... H04L 43/0864; H04L 43/18; H04L 43/106; H04Q 11/0001; H04Q 11/0066; H04Q 2011/0083
See application file for complete search history.

(56) References Cited

U.S. PATENT DOCUMENTS

| | | | |
|---|---|---|---|
| 2007/0064614 A1 | 3/2007 | Kataoka | |
| 2012/0148248 A1* | 6/2012 | Li | H04J 3/065 398/58 |
| 2014/0064722 A1* | 3/2014 | Losio | H04L 43/0858 398/25 |
| 2014/0270754 A1* | 9/2014 | Loehr | H04J 3/0682 398/25 |
| 2016/0315840 A1* | 10/2016 | Huang | H04J 3/065 |

FOREIGN PATENT DOCUMENTS

| | | |
|---|---|---|
| CN | 101582733 A | 11/2009 |
| CN | 102098155 A | 6/2011 |
| CN | 102130735 A | 7/2011 |
| CN | 102291196 A | 12/2011 |
| CN | 102843620 A | 12/2012 |
| EP | 2241065 A1 | 10/2010 |
| EP | 2472754 A1 | 7/2012 |
| EP | 2600546 A1 | 6/2013 |
| JP | 2013121014 A | 6/2013 |
| WO | 2009099357 A1 | 8/2009 |
| WO | 2010145284 A1 | 12/2010 |

OTHER PUBLICATIONS

English Translation of the Written Opinion of the International Search Authority in international application No. PCT/CN2014/080018, dated Oct. 14, 2014.

Supplementary European Search Report in European application No. 14801446.7, dated Sep. 26, 2016.

* cited by examiner

METHOD FOR MEASURING TRANSMISSION DELAY OF OPTICAL TRANSPORT NETWORK DEVICE AND SOURCE OTN DEVICE

TECHNICAL FIELD

The disclosure relates to the field of data transmission of an Optical Transport Network (OTN) device, and in particular to a method for measuring a transmission delay of an OTN device, and a source OTN device.

BACKGROUND

An OTN has a high-capacity long-distance transport capability, may provide multiple protection manners and end-to-end monitoring management and may provide a high-reliability support platform for data transmission, and moreover, the OTN provides a circuit-based interaction technology to fully ensure a guaranteed bandwidth, and is an inevitable choice for an underlying transmission technology.

An OTN is a transport network which is organized in an optical layer on the basis of a wavelength division multiplexing technology, and is a backbone transport network of the next generation. A frame structure of the OTN may support mapping and transparent transmission of various client signals, such as a Synchronous Digital Hierarchy (SDH), an Asynchronous Transfer Mode (ATM) and the Ethernet. Along with explosive growth of Internet Protocol (IP) services and other packet-transport-based data services transported on a network, the OTN may take data services as bearing main bodies in the future. A transmission delay index is a key index for transmission of a data service, and thus, how to rapidly and effectively know an end-to-end delay through a path of a transmission network is very important.

At present, there are mainly three technologies for implementing measurement of an end-to-end delay of an OTN device: (1) a length of an optical fibre is divided by a propagation speed of light in the optical fibre, in which since the propagation speed of the light is very high, the OTN device has a transit delay and the length of the optical fibre is not so easy to be determined accurately, the method may only provide a basis for rough estimation; (2) a delay testing function provided by a testing instrument of a third party is adopted for assisting in testing, such a method is usually used for start and acceptance testing of OTN device, its result is widely accepted by the industry, but such a method has such a requirement that the instrument is connected to the device and the device has an idle port, and may not be applicable to some existing network environments; and (3) a new delay measurement characteristic is added to standard G.709/Y.1331, such a method redefines overhead bytes reserved in Optical Channel Data Unit k (ODUk) and Tandem Connection Monitor i (TCMi) before and may measure a delay of end-to-end ODUk or any TCMi, and although such a method is simple, existing network device may be greatly modified, and such a standard is inapplicable to the condition of existence of relay device.

SUMMARY

In order to solve the existing technical problem, the embodiment of the disclosure provides a method for measuring a transmission delay of OTN device and source OTN device.

The embodiment of the disclosure provides a method for measuring a transmission delay of an OTN device, which may include:

a source OTN device generates a delay request frame when receiving a delay measurement request sent by a user, and sends the delay request frame to a destination OTN device;

the source OTN device receives a returned response frame from the destination OTN device, the response frame being generated by the destination OTN device on the basis of the received delay request frame and the response frame including first time information;

upon reception of the response frame returned by the destination OTN device, the source OTN device acquires system time $T4$ when the source OTN device receives the response frame; and the source OTN device parses the response frame to obtain the first time information, and calculates a transmission delay between the source OTN device and the destination OTN device according to the system time $T4$ when the response frame is received and the first time information.

In an embodiment, the first time information may include: system time $T1$ when the source OTN device sends the delay request frame, time $T2$ when the destination OTN device receives the delay request frame and system time $T3$ when the destination OTN device sends the response frame.

In an embodiment, the step that the source OTN device generates the delay request frame when receiving the delay measurement request sent by the user may include:

the source OTN device generates a delay request message when receiving the delay measurement request sent by the user, the delay request message including a message type and a request message sending timestamp; and the source OTN device fills the delay request message into an OTN frame to generate the delay request frame.

In an embodiment, the transmission delay may include a total round trip delay $T7$, or, may include a sending delay $T5$, a receiving delay $T6$ and the total round trip delay $T7$, where $$T7=(T2-T1)+(T4-T3);$$

$$T5=T2-T1; \text{ and}$$

$$T6=T4-T3.$$

In an embodiment, the step that upon reception of the response frame returned by the destination OTN device, the source OTN device acquires the system time $T4$ when the source OTN device receives the response frame may include:

the source OTN device parses a Payload Type (PT) and message type in the response frame when receiving the response frame returned by the destination OTN device, and upon determining that the response frame is a delay response frame, acquires the system time $T4$ when the source OTN device receives the response frame.

The embodiment of the disclosure further provides a source OTN device, which may include:

a receiving module configured to receive a delay measurement request sent by a user;

a generation module configured to generate a delay request frame when the receiving module receives the delay measurement request sent by the user;

a transceiver module configured to send the delay request frame to a destination OTN device and configured to receive a returned response frame from the destination OTN device, the response frame being generated by the destination OTN device on the basis of the received delay request frame and the response frame including first time information;

an acquisition module configured to, when the transceiver module receives the response frame returned by the destination OTN device, acquire system time T4 when the source OTN device receives the response frame;

a parsing module configured to parse the response frame to obtain the first time information; and a calculation module configured to calculate a transmission delay between the source OTN device and the destination OTN device according to the system time T4 when the response frame is received and the first time information.

In an embodiment, the generation module may include:

a first generation unit configured to generate a delay request message when the receiving module receives the delay measurement request sent by the user, the delay request message including a message type and a request message sending timestamp; and a second generation unit configured to fill the delay request message into an OTN frame to generate the delay request frame.

In an embodiment, the acquisition module may include:

a parsing unit configured to, when the transceiver module receives the response frame returned by the destination OTN device, parse a PT and message type in the response frame to determine whether the response frame is a delay response frame or not; and an acquisition unit configured to, when it is determined that the response frame is a delay response frame, acquire the system time T4 when the source OTN device receives the response frame.

The embodiment of the disclosure further provides a computer storage medium having stored therein a set of instructions that, when executed, cause at least one processor to execute the abovementioned method for measuring the transmission delay of an OTN device.

By means of the technical solutions according to the embodiment of the disclosure, the source OTN device may conveniently and accurately measure the transmission delay of the OTN device by sending the delay request frame and receiving the response frame.

Achievement of a purpose, function characteristics and advantages of the disclosure will be further described with reference to embodiments and the drawings.

DETAILED DESCRIPTION

It should be understood that specific embodiments described here are only adopted to explain the disclosure and not intended to limit the disclosure.

In various embodiments of the disclosure: a source OTN device generates a delay request frame when receiving a delay measurement request sent by a user, and sends the delay request frame to a destination OTN device; the source OTN device receives a returned response frame from the destination OTN device, and acquires system time T4 when the source OTN device receives the response frame; and the source OTN device parses the response frame to obtain first time information, and calculates a transmission delay between the source OTN device and the destination OTN device according to T4 and the first time information.

Figure 1:
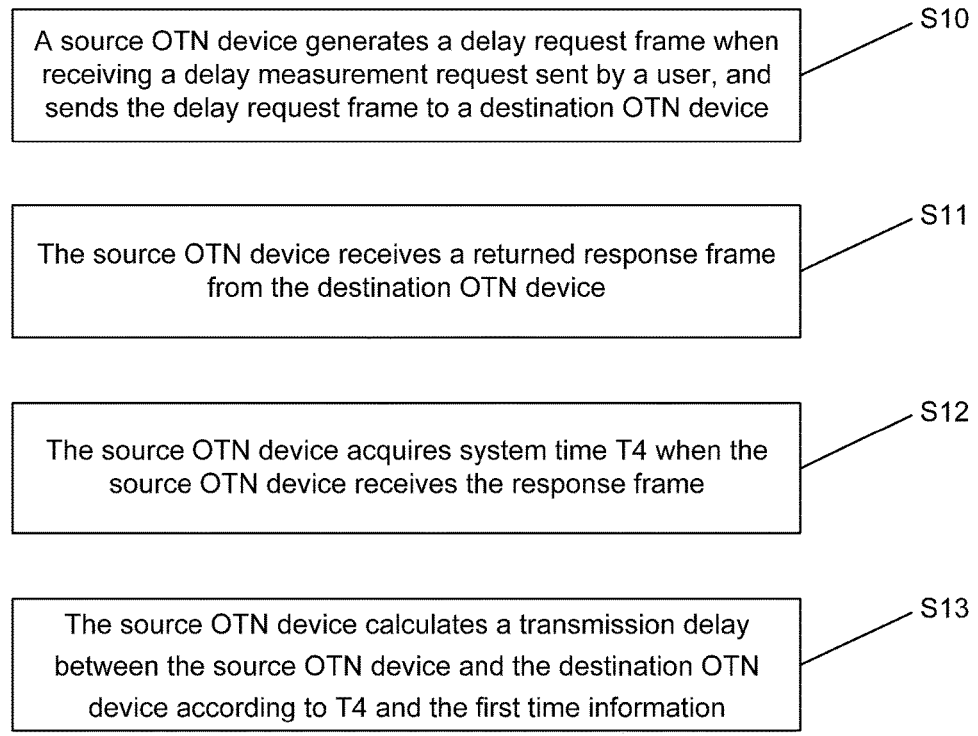
FIG. 1 is a flowchart of a method for measuring a transmission delay of an OTN device according to an embodiment of the disclosure.

Referring to FIG. 1, FIG. 1 is a flowchart of a method for measuring a transmission delay of OTN device according to an embodiment of the disclosure, and the method includes the following steps.

S10: a source OTN device generates a delay request frame when receiving a delay measurement request sent by a user, and sends the delay request frame to a destination OTN device.

The source OTN device generates the delay request frame when receiving the delay measurement request sent by the user, the delay request frame is a standard OTN frame, and the source OTN device sends the delay request frame to the destination OTN device by adopting a Network Time Protocol (NTP). The delay request frame includes system time T1 when the source OTN device sends the delay request frame, and further includes an address of the source OTN device, an address of the destination OTN device and the like.

The step that the source OTN device generates the delay request frame when receiving the delay measurement request sent by the user includes: A1, the source OTN device generates a delay request message when receiving the delay measurement request sent by the user; and A2, the source OTN device fills the delay request message into an OTN frame to generate the delay request frame, and specifically fills the delay request message into Optical Channel Payload Unit k (OPUk) of the standard OTN frame to generate the delay request frame. The value of the PT of the delay request frame is 0x1D (when the value of the PT is 0x1D, it is indicated that the delay request message is filled into OPUk of the delay request frame).

A structure of the delay request message, as shown in Table 1 (the delay request message includes totally 46 bytes), specifically includes: a version number (4 bit): temporally determined to be 01; a message type (4 bit): 1 for a request message and 2 for a response message; time accuracy (4 bit): defined to be correct to a few decimal places by taking millisecond (ms) as a reference; reserved (4 bit): reserved for subsequent use; a source address identifier (4 Byte): representative of the address of the source OTN device; a destination address identifier (4 Byte): representative of the address of the destination OTN device; a request message sending timestamp (4 Byte): time when the request message is sent; a request message receiving timestamp (4 Byte): time when the request message is received; a response message sending timestamp (4 Byte): time when a response message is sent; a response message receiving timestamp (4 Byte): time when the response message is received; and reserved (20 Byte): reserved for subsequent use.

TABLE 1

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| Version number (4 bit) Message type (4 bit) Time accuracy (4 bit) Reserved (4 bit) | | | | | | | | | | | | | | | |
| Source address identifier (4 Byte) | | | | | | | | | | | | | | | |

TABLE 1-continued

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| Destination address identifier (4 Byte) ||||||||||||||||
| Request message sending timestamp (4 Byte) ||||||||||||||||
| Request message receiving timestamp (4 Byte) ||||||||||||||||
| Response message sending timestamp (4 Byte) ||||||||||||||||
| Response message receiving timestamp (4 Byte) ||||||||||||||||
| Reserved (20 Byte) ||||||||||||||||

In the step, system time T1 when the source OTN device sends the delay request frame is written into the request message sending timestamp (4 Byte) of the delay request message, the address of the source OTN device is written into the source address identifier (4 Byte), the address of the destination OTN device is written into the destination address identifier (4 Byte) and 1 is written into the message type (4 bit).

S11: the source OTN device receives a returned response frame from the destination OTN device, the response frame being generated by the destination OTN device on the basis of the received delay request frame and the response frame including first time information.

The response frame is generated by the destination OTN device on the basis of the received delay request frame. Upon receiving the delay request frame, the destination OTN device parses the delay request frame to obtain the system time T1 when the source OTM device sends the delay request frame, acquires time T2 when the destination OTN device receives the delay request frame, acquires system time T3 when being about to send the response frame to the source OTN device, and then generates the response frame. The response frame includes the first time information, and the first time information includes the system time T1 when the source OTN device sends the delay request frame, the time T2 when the destination OTN device receives the delay request frame and the system time T3 when the destination OTN device sends the response frame.

Specifically, the destination OTN device parses a PT and message type in the delay request frame to determine whether the delay request frame is really a delay measurement request or not when receiving the delay request frame sent by the source OTN device, and when a value of the PT is 0x1D and the message type is 1, it may be determined that the delay request frame is really a delay measurement request, the destination OTN device is required to send the response frame to the source OTN device, and the destination OTN device parses the delay request frame to obtain the system time T1 when the source OTN device sends the delay request frame, acquires the time T2 when the destination OTN device receives the delay request frame and acquires the system time T3 when the destination OTN device is about to send the response frame to the source OTN device; and when it is determined that the delay request frame is not a delay measurement request (that is, the value of the PT in the delay request frame is not 0x1D and/or the message type is not 1), the destination OTN device does not send the response frame to the source OTN device.

The response frame is also a standard OTN frame, and the destination OTN device sends the response frame to the source OTN device adopting the NTP. A structure of the response frame is the same as the structure of the delay request frame, as shown in Table 1. The step that the destination OTN device generates the response frame on the basis of the received delay request frame includes: B1, the destination OTN device generates a delay response message on the basis of the received delay request frame; and B2, the destination OTN device fills the delay response message into a standard OTN frame to generate the response frame, and specifically fills the delay response message into OPUk of the standard OTN frame to generate the response frame. A value of the PT of the response frame is 0x1D (when the value of the PT is 0x1D, it is indicated that the delay response message is filled into OPUk of the response frame). In Step B1, the system time T1 when the source OTN device sends the delay request frame is written into the request message sending timestamp (4 Byte) of the delay response message, the time T2 when the destination OTN device receives the delay request frame is written into the request message receiving timestamp (4 Byte), the system time T3 when the destination OTN device sends the response frame is written into the response message sending timestamp (4 Byte) and 2 is written into the message type (4 bit).

S12: upon reception of the response frame returned by the destination OTN device, the source OTN device acquires system time T4 when the source OTN device receives the response frame.

S13: the source OTN device parses the response frame to obtain the first time information, and calculates a transmission delay between the source OTN device and the destination OTN device according to T4 and the first time information.

The transmission delay includes a total round trip delay T7, or, includes a sending delay T5, a receiving delay T6 and the total round trip delay T7, where $$T7=(T2-T1)+(T4-T3);$$

$$T5=T2-T1; \text{ and}$$

$$T6=T4-T3.$$

Step S12 may include the following steps.

S121: the source OTN device parses the PT and message type in the response frame to determine whether the response frame is a delay response frame or not when receiving the response frame returned by the destination OTN device, and executes Step 122 if the response frame is a delay response frame.

The source OTN device parses the PT and message type in the response frame when receiving the response frame returned by the destination OTN device; when a value of the PT is 0x1D and the message type is 2, it may be determined that the response frame is a delay response frame, and Step 122 is executed; and when the value of the PT is not 0x1D and/or the message type is not 2, it may be determined that the response frame is not a delay response frame, and the source OTN device does not process the response frame, and discards the response frame.

S122: the source OTN device acquires the system time T4 when the source OTN device receives the response frame.

After Step S13, the method further includes:

Step 14: the calculated transmission delay is displayed.

In the step, the calculated transmission delay is displayed, so that the user may conveniently view the transmission delay between the source OTN device and the destination OTN device.

Figure 2:
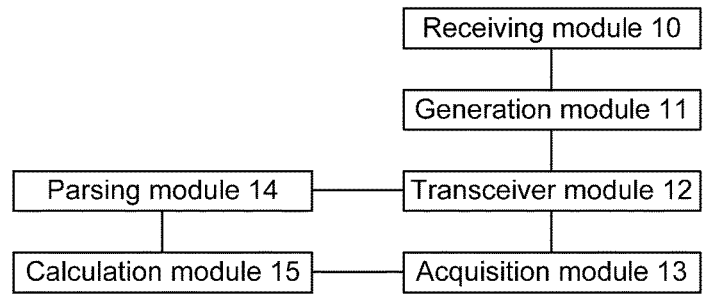
FIG. 2 is a schematic structural diagram of a source OTN device according to an embodiment of the disclosure.

FIG. 2 is a structure diagram of source OTN device according to an embodiment of the disclosure, and the source OTN device includes: a receiving module 10, a generation module 11 connected with the receiving module 10, a transceiver module 12 connected with the generation module 11, an acquisition module 13 and parsing module 14 connected with the transceiver module 12, and a calculation module 15 connected with the acquisition module 13 and the parsing module 14 respectively, in which:

the receiving module 10 is configured to receive a delay measurement request sent by a user;

the generation module 11 is configured to generate a delay request frame when the receiving module 10 receives the delay measurement request sent by the user;

the transceiver module 12 is configured to send the delay request frame to destination OTN device and configured to receive a returned response frame from the destination OTN device, the response frame being generated by the destination OTN device on the basis of the received delay request frame and the response frame including first time information;

the acquisition module 13 is configured to, when the transceiver module 12 receives the response frame returned by the destination OTN device, acquire system time T4 when the source OTN device receives the response frame;

the parsing module 14 is configured to parse the response frame to obtain the first time information; and the calculation module 15 is configured to calculate a transmission delay between the source OTN device and the destination OTN device according to T4 and the first time information.

The generation module 11 generates the delay request frame when the receiving module 10 receives the delay measurement request sent by the user, the delay request frame is a standard OTN frame, and the source OTN device sends the delay request frame to the destination OTN device by adopting an NTP. The delay request frame includes system time T1 when the source OTN device sends the delay request frame, and further includes an address of the source OTN device, an address of the destination OTN device and the like.

The generation module 11 includes a first generation unit and a second generation unit. The first generation unit is configured to generate a delay request message when the receiving module 10 receives the delay measurement request sent by the user; the delay request message includes a message type and a request message sending timestamp; and the second generation unit is configured to fill the delay request message generated by the first generation unit into a standard OTN frame to generate the delay request frame. Specifically, the second generation unit fills the delay request message into OPUk of the standard OTN frame to generate the delay request frame. A value of the PT of the delay request frame is 0x1D (when the value of the PT is 0x1D, it is indicated that the delay request message is filled into OPUk of the delay request frame).

A structure of the delay request message, as shown in Table 1 (the delay request message includes totally 46 bytes), specifically includes: a version number (4 bit): temporally determined to be 01; a message type (4 bit): 1 for a request message and 2 for a response message; time accuracy (4 bit): defined to be correct to a few decimal places by taking ms as a reference; reserved (4 bit): reserved for subsequent use; a source address identifier (4 Byte): representative of the address of the source OTN device; a destination address identifier (4 Byte): representative of the address of the destination OTN device; a request message sending timestamp (4 Byte): time when the request message is sent; a request message receiving timestamp (4 Byte): time when the request message is received; a response message sending timestamp (4 Byte): time when a response message is sent; a response message receiving timestamp (4 Byte): time when the response message is received; and reserved (20 Byte): reserved for subsequent use.

The generation module 11 writes system time T1 when the source OTN device sends the delay request frame into the request message sending timestamp (4 Byte) of the delay request message, writes the address of the source OTN device into the source address identifier (4 Byte), writes the address of the destination OTN device into the destination address identifier (4 Byte) and writes 1 into the message type (4 bit).

The transceiver module 12 receives the returned response frame from the destination OTN device, the response frame being generated by the destination OTN device on the basis of the received delay request frame. The destination OTN device parses the delay request frame to obtain the system time T1 when the source OTM device sends the delay request frame when receiving the delay request frame, acquires time T2 when the destination OTN device receives the delay request frame, acquires system time T3 when being about to send the response frame to the source OTN device, and then generates the response frame. The response frame includes the first time information, and the first time information includes the system time T1 when the source OTN device sends the delay request frame, the time T2 when the destination OTN device receives the delay request frame and the system time T3 when the destination OTN device sends the response frame.

Specifically, the destination OTN device parses a PT and message type in the delay request frame to determine whether the delay request frame is really a delay measurement request or not when receiving the delay request frame sent by the source OTN device, and when a value of the PT is 0x1D and the message type is 1, it may be determined that the delay request frame is really a delay measurement request, the destination OTN device is required to send the response frame to the source OTN device, and the destination OTN device parses the delay request frame to obtain the system time T1 when the source OTN device sends the delay request frame, acquires the time T2 when the destination OTN device receives the delay request frame and acquires the system time T3 when the destination OTN device is about to send the response frame to the source OTN device; and when it is determined that the delay request frame is not a delay measurement request (that is, the value of the PT in the delay request frame is not 0x1D and/or the message type is not 1), the destination OTN device does not send the response frame to the source OTN device.

The response frame is also a standard OTN frame, and the destination OTN device sends the response frame to the source OTN device adopting the NTP. A structure of the response frame is the same as the structure of the delay request frame, as shown in Table 1. The step that the destination OTN device generates the response frame on the basis of the received delay request frame includes: B1, the destination OTN device generates a delay response message on the basis of the received delay request frame; and B2, the destination OTN device fills the delay response message into a standard OTN frame to generate the response frame, and specifically fills the delay response message into OPUk of the standard OTN frame to generate the response frame. A value of the PT of the response frame is 0x1D (when the value of the PT is 0x1D, it is indicated that the delay response message is filled into OPUk of the response frame). The destination OTN device writes the system time T1 when the source OTN device sends the delay request frame into the request message sending timestamp (4 Byte) of the delay response message, writes the time T2 when the destination OTN device receives the delay request frame into the request message receiving timestamp (4 Byte), writes the system time T3 when the destination OTN device sends the response frame into the response message sending timestamp (4 Byte) and writes 2 into the message type (4 bit).

The transmission delay includes a total round trip delay T7, or, includes a sending delay T5, a receiving delay T6 and the total round trip delay T7, where $$T7=(T2-T1)+(T4-T3);$$

$$T5=T2-T1; \text{ and}$$

$$T6=T4-T3.$$

Furthermore, the acquisition module 13 includes a parsing unit and an acquisition unit.

The parsing unit is configured to, when the transceiver module 12 receives the response frame returned by the destination OTN device, parse the PT and message type in the response frame to determine whether the response frame is a delay response frame or not; and the acquisition unit is configured to, when the response frame is a delay response frame, acquire the system time T4 when the source OTN device receives the response frame.

The parsing unit of the source OTN device parses the PT and message type in the response frame when receiving the response frame returned by the destination OTN device; when a value of the PT is 0x1D and the message type is 2, it may be determined that the response frame is a delay response frame; and when the value of the PT is not 0x1D and/or the message type is not 2, it may be determined that the response frame is not a delay response frame, and the source OTN device does not process the response frame, and discards the response frame.

Furthermore, the source OTN device further includes a display module connected with the calculation module 15, configured to display the calculated transmission delay. The user may conveniently view the transmission delay between the source OTN device and the destination OTN device through the display module.

During practical application, the receiving module 10 and the transceiver module 12 may be implemented by a transceiver in the source OTN device, and the first generation unit and second generation unit in the generation module 11, the parsing unit and acquisition unit in the acquisition module 13, the parsing module 14 and the calculation module 15 may be implemented by a Central Processing Unit (CPU), Digital Signal Processor (DSP) or Field-Programmable Gate Array (FPGA) in the source OTN device; and the display module may be implemented by a display in the source OTN device.

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory, an optical memory and the like) including computer-available program codes.

The disclosure is described with reference to flowcharts and/or block diagrams of the method, device (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

The above is only the preferred embodiment of the disclosure and not intended to limit the scope of patent of the disclosure, and all equivalent structure or equivalent flow transformations made by virtue of contents of the specification and drawings of the disclosure or direct or indirect application of the contents to other related arts shall similarly fall within the scope of protection of the disclosure.

What is claimed is:

1. A method for measuring a transmission delay of an Optical Transport Network (OTN) device, comprising:

generating, by a source OTN device, a delay request frame when receiving a delay measurement request sent by a user, and sending the delay request frame to a destination OTN device;

receiving, by the source OTN device, a returned response frame from the destination OTN device, the response frame being generated by the destination OTN device on the basis of the received delay request frame and the response frame comprising first time information;

upon reception of the response frame returned by the destination OTN device, acquiring, by the source OTN device, system time T4 when the source OTN device receives the response frame; and parsing, by the source OTN device, the response frame to obtain the first time information, and calculating a transmission delay between the source OTN device and the destination OTN device according to the system time T4 when the response frame is received and the first time information;

wherein the generating, by the source OTN device, the delay request frame when receiving the delay measurement request sent by the user comprises:
generating, by the source OTN device, a delay request message when receiving the delay measurement request sent by the user, the delay request message comprising a message type and a request message sending timestamp; and
filling, by the source OTN device, the delay request message into Optical Channel Payload Unit k (OPUk) of an OTN frame to generate the delay request frame;
wherein upon reception of the response frame returned by the destination OTN device, acquiring, by the source OTN device, the system time T4 when the source OTN device receives the response frame comprises:
parsing, by the source OTN device, a Payload Type (PT) and message type in the response frame when receiving the response frame returned by the destination OTN device, and upon determining that the response frame is a delay response frame, acquiring the system time T4 when the source OTN device receives the response frame.

2. The method according to claim 1, wherein the first time information comprises: system time T1 when the source OTN device sends the delay request frame, time T2 when the destination OTN device receives the delay request frame and system time T3 when the destination OTN device sends the response frame.

3. The method according to claim 2, wherein the transmission delay comprises a total round trip delay T7, or, comprises a sending delay T5, a receiving delay T6 and the total round trip delay T7, where $$T7=(T2-T1)+(T4-T3);$$

$$T5=T2-T1; \text{ and}$$

$$T6=T4-T3.$$

4. A source Optical Transport Network (OTN) device, comprising:
a receiving module configured to receive a delay measurement request sent by a user;
a generation module configured to generate a delay request frame when the receiving module receives the delay measurement request sent by the user;
a transceiver module configured to send the delay request frame to a destination OTN device and configured to receive a returned response frame from the destination OTN device, the response frame being generated by the destination OTN device on the basis of the received delay request frame and the response frame comprising first time information;
an acquisition module configured to, when the transceiver module receives the response frame returned by the destination OTN device, acquire system time T4 when the source OTN device receives the response frame;
a parsing module configured to parse the response frame to obtain the first time information; and
a calculation module configured to calculate a transmission delay between the source OTN device and the destination OTN device according to the system time T4 when the response frame is received and the first time information;
wherein the generation module comprises:
a first generation unit configured to generate a delay request message when the receiving module receives the delay measurement request sent by the user, the delay request message comprising a message type and a request message sending timestamp; and
a second generation unit configured to fill the delay request message into Optical Channel Payload Unit k (OPUk) of an OTN frame to generate the delay request frame;
wherein the acquisition module comprises:
a parsing unit configured to, when the transceiver module receives the response frame returned by the destination OTN device, parse a Payload Type (PT) and message type in the response frame to determine whether the response frame is a delay response frame or not; and
an acquisition unit configured to, when it is determined that the response frame is a delay response frame, acquire the system time T4 when the source OTN device receives the response frame.

5. The source OTN device according to claim 4, wherein the first time information comprises: system time T1 when the source OTN device sends the delay request frame, time T2 when the destination OTN device receives the delay request frame and system time T3 when the destination OTN device sends the response frame.

6. The source OTN device according to claim 5, wherein the transmission delay comprises a total round trip delay T7, or, comprises a sending delay T5, a receiving delay T6 and the total round trip delay T7, where $$T7=(T2-T1)+(T4-T3);$$

$$T5=T2-T1; \text{ and}$$

$$T6=T4-T3.$$

7. A computer storage medium having stored therein a set of instructions that, when executed, cause at least one processor to execute a method for measuring an transmission delay of an Optical Transport Network (OTN) device, the method comprising:
generating, by a source OTN device, a delay request frame when receiving a delay measurement request sent by a user, and sending the delay request frame to a destination OTN device;
receiving, by the source OTN device, a returned response frame from the destination OTN device, the response frame being generated by the destination OTN device on the basis of the received delay request frame and the response frame comprising first time information;
upon reception of the response frame returned by the destination OTN device, acquiring, by the source OTN device, system time T4 when the source OTN device receives the response frame; and
parsing, by the source OTN device, the response frame to obtain the first time information, and calculating a transmission delay between the source OTN device and the destination OTN device according to the system time T4 when the response frame is received and the first time information;
wherein the generating, by the source OTN device, the delay request frame when receiving the delay measurement request sent by the user comprises:
generating, by the source OTN device, a delay request message when receiving the delay measurement request sent by the user, the delay request message comprising a message type and a request message sending timestamp; and filling, by the source OTN device, the delay request message into Optical Channel Payload Unit k (OPUk) of an OTN frame to generate the delay request frame;

wherein upon reception of the response frame returned by the destination OTN device, acquiring, by the source OTN device, the system time T4 when the source OTN device receives the response frame comprises:

parsing, by the source OTN device, a Payload Type (PT) and message type in the response frame when receiving the response frame returned by the destination OTN device, and upon determining that the response frame is a delay response frame, acquiring the system time T4 when the source OTN device receives the response frame.

8. The computer storage medium according to claim 7, wherein the first time information comprises: system time T1 when the source OTN device sends the delay request frame, time T2 when the destination OTN device receives the delay request frame and system time T3 when the destination OTN device sends the response frame.

9. The computer storage medium according to claim 8, wherein the transmission delay comprises a total round trip delay T7, or, comprises a sending delay T5, a receiving delay T6 and the total round trip delay T7, where $$T7=(T2-T1)+(T4-T3);$$

$$T5=T2-T1; \text{ and}$$

$$T6=T4-T3.$$

* * * * *